(12) United States Patent
Willis

(10) Patent No.: US 6,503,401 B1
(45) Date of Patent: Jan. 7, 2003

(54) EFFLUENT PURIFYING SYSTEM

(75) Inventor: Terry K. Willis, Baldwin, GA (US)

(73) Assignee: KGF Properties, Inc., Atlanta, GA (US)

( * ) Notice: Subject to any disclaimer, the term of this patent is extended or adjusted under 35 U.S.C. 154(b) by 0 days.

(21) Appl. No.: 09/546,848

(22) Filed: Apr. 11, 2000

Related U.S. Application Data

(60) Provisional application No. 60/130,608, filed on Apr. 22, 1999.

(51) Int. Cl.$^7$ .................................................. C02F 1/32
(52) U.S. Cl. ...................... 210/748; 210/742; 210/791; 210/85; 210/103; 210/195.1; 210/259; 210/407; 210/908
(58) Field of Search ................................ 210/742, 748, 210/791, 85, 103, 195.1, 259, 407, 908

(56) References Cited

U.S. PATENT DOCUMENTS

| | | | | |
|---|---|---|---|---|
| 4,282,831 A | * | 8/1981 | Nilsen | |
| 4,777,137 A | * | 10/1988 | Lemonnier | |
| 5,178,755 A | * | 1/1993 | LaCrosse | |
| 5,484,538 A | * | 1/1996 | Woodward | |
| 6,153,105 A | * | 11/2000 | Tadlock et al. | |
| 6,235,191 B1 | * | 5/2001 | Nakamura | |
| 6,312,589 B1 | * | 11/2001 | Jarocki et al. | |

* cited by examiner

Primary Examiner—Betsey Morrison Hoey
(74) Attorney, Agent, or Firm—Troutman Sanders LLP; Todd Deveau; Ryan A. Schneider

(57) ABSTRACT

An automatic system and process for effectively, reliably and economically reconditioning for direct reuse various waste water, and particularly that in the poultry and other food processing industries, without the use of added chemicals and filter-aid compounds. The system includes water filtration and purification units, the purification unit consisting of an ultra-violet sterilizer. The integrity of the reconditioned water is continuously monitored in-line by sensors, which information is directly correlated to correspond to associated levels of solids and microorganisms. This invention presents a fully automated process to provide reconditioned water essentially free of microorganisms and of acceptable clarity to meet current United States Department of Agriculture regulations for food processing reuse.

20 Claims, 3 Drawing Sheets

EFFLUENT PURIFYING SYSTEM

This application claims the benefit of Provisional application Ser. No. 60/130,608 filed on Apr. 22, 1999.

BACKGROUND OF THE INVENTION

1. Field of the Invention

The invention relates to an effluent purifying system that enables the reuse of the circulating effluent upon purification. More particularly, the invention relates to a purification method and apparatus for cleansing water of a water bath in a chiller unit used in poultry processing so the chiller wastewater can be recycled and subsequently recirculated throughout the chiller.

2. Description of Related Art

Water traditionally has been a key processing medium in food processing plants. Water is used throughout all steps of the food production process, including food cleaning, sanitizing, peeling, cooking and cooling. Water also is used as a conveyor medium that transports food materials throughout the process. Water additionally is used to clean the equipment of the processing plants between operations. Food processing is thus a water-intensive operation.

The wastewater of such food production has attributes that are distinct from other industrial activities. In particular, food processing wastewater can be characterized as "friendly" in that it generally does not contain conventional toxic chemicals such as those listed under the Environmental Protection Agency's (EPA) Toxic Release Inventory. However, food-processing wastewaters can be subject to bacterial contamination that represents a special issue for wastewater reuse.

Food processing wastewaters are distinguished by their conventionally high Biochemical Oxygen Demand (BOD) concentrations, high levels of dissolved and/or suspended solids, nutrients and minerals. If separated or recovered, many of these constituents have value in secondary markets. Reclaimed materials have value through 1) direct in-plant reuse (e.g., recovery of sugars from fruit canning), 2) sale to external markets (e.g., recovery of pasta starch for animal feed or for compost), and/or 3) use in energy recovery (e.g., through biological or thermochemical gasification).

The characteristics and generation rates of food processing wastewater are highly variable, depending on the specific types of food processing operations. One important attribute is the general scale of the operations, since the range of food processing extends from small, local operations to large-scale national and international producers. This difference in scale not only is relevant in identifying sources of wastewater, but also in determining appropriate reduction or recycling options. In addition to scale differences, the types of food production processes (e.g., poultry, meat, fish, fruit, vegetable, oils and dairy) vary widely, with associated differences in the specific wastewater contaminants. Even within a given food processing plant, the wastewater discharged from different unit operations—or from different seasons—may vary with respect to flow rates and compositions. These characteristics will all affect how readily a new reduction or recycling technology can show a return on investment.

In addition to the variability in internal operating conditions, external constraints on food production wastewater management also vary widely. Wastewater disposal costs, which are a key driver for reduction/recycling technologies, will vary based on a given food processor's location and pertinent regulatory requirements.

With the many obstacles facing wastewater reuse, water traditionally has been used on a once through basis in the food processing industry. However, due to rising utility costs, scarcity of available fresh water, costly more stringent wastewater disposal surcharges and pollution regulations, processors must now look at recycling process wastewaters, and specifically chiller overflow waters, to achieve reduced operational costs.

It is customary in the poultry processing industry to ship live birds to a processing plant where they are bled, scalded, defeathered and eviscerated. Since the scalding operations are usually carried out at about 128 degrees Fahrenheit, the eviscerated birds must be subsequently chilled prior to packaging and shipping. Before the 1960's, poultry was chilled in layers of ice or immersed in small tanks of ice water. The poultry was chilled using these methods for a sufficient amount of time to reduce the temperature of the poultry to about 40 degrees Fahrenheit or below, after which the tanks were emptied. The use of small, individual single-use tanks required significant resources, including space, employees and water or ice. Because of these disadvantages in single-use tanks, continuous immersion chillers were developed.

Continuous immersion chillers are one or more large tanks where fresh chilled water is continually replenished through which poultry carcasses continuously enter and exit. Modern chillers are equipped with refrigeration units and systems for controlling water volume, direction and agitation. These types of chillers have become more and more efficient, rapid and economical to use.

Presently, the birds are chilled in this continuous fashion in an open tank containing a mixture of ice and water for a period of about 4 to 24 hours. The water chilling step not only is used to cool the birds after scalding, but also is used for the purpose of cleaning away most of the internal and external bacteria of the birds prior to packaging. After the birds have been chilled, they are usually packed in crates with ice and shipped.

The aforementioned procedures suffer from at least three major drawbacks. First, the chiller is quickly contaminated with fecal matter, *escherichia coli* and salmonellae from the birds. These contaminants are eventually distributed throughout the chiller water and contaminate all of the carcasses moving through the system. Second, the contaminated water of the chiller presents a serious disposal problem. Processors incur substantial toll charges when dumping the contaminated water into either private lagoons or municipal sewer systems. Lastly, continual dumping of the contaminated water necessitates the replenishment with fresh water of the food processing system at significant costs.

In addition to these disadvantages, federal government regulations do not mandate the industry use enough make-up fresh water in the chiller to keep the system clean (only a half gallon per bird), nor does the government regulate how much water should be used in cleanup. Further, many in the industry try to cut costs associated with the water demands by simply using less water, leading to increased incidents of contamination.

In relation to the waste chill water, in recent years there has been increasing awareness and concern with the possibility of poultry and meat being infected with, in particular, pathogenic microorganisms such as species of salmonella or listeria bacteria, with a resultant risk of disease outbreak following human consumption of poultry, meat or meat-based foodstuffs infected in this manner. Throughout the world there are many guidelines and regulations controlling reuse of waste chill water. The poultry industry and the United States Department of Agriculture (USDA) have attempted to deal with these problems by raising the amount of make-up water to an additional half-gallon of fresh water (or four pounds of ice) for each bird that enters the chiller. Although this procedure can maintain the contaminant concentration of the chiller water at a certain level, this amount of new water remains insufficient to keep the system clean, and the process is extremely inefficient because enormous quantities of fresh water are necessary. Moreover, the procedure does not obviate the wastewater disposal problem, but actually enhances wastewater problems.

The industry has further dealt with the problem of pathogenic contamination by constructing chillers with an overflow feature that acts as a skimmer to remove water containing fat particles (floating on top) from the chiller. However, chillers constructed with such overflow features still require enormous amounts of fresh water, and further require a floor drain. Because dirty water flows out onto the floor of the plant, these types of chillers result in unsanitary working conditions.

Treating and recycling some of the wastewater used in poultry processing can save plant managers a great deal of money by cutting both water and sewer costs. USDA recycling regulations now require that the wastewater treatment processes reduce microorganism concentrations by at least 60 percent, including coliformns, *escherichia coli*, salmonella, and the total microorganism count. The regulations also call for the treated water to have a light transmission (T) of at least 60 percent at 500 nanometers (nm). As the quality of reconditioned water improves, less of the reconditioned water is required to replace a gallon of fresh water in the chiller.

The chemical oxygen demand (COD) and total solids (TS) in wastewater streams from poultry plants usually average 2,000 milligrams per liter (mg/l) each. Waste concentrations vary with the source of the wastewater. They can range from a high of 4,000 mg/l for COD demand and 3,000 mg/l for TS in the giblet chiller effluent, to a low of 250 mg/l for each of these parameters in the wastewater from the whole bird washer. In regard to these USDA regulations, if a poultry plant processes 240,000 broilers per day, it uses at least 120,000 gallons of fresh water daily to chill carcasses. Yet, if 80 percent of that water could be reconditioned, 96,000 gallons of water could be saved each day. At a cost of, for example, $1.90 per thousand gallons for water and sewer charges, this plant could save 24,000,000 gallons of water valued at more than $45,000 per year.

Chemical oxygen demand and total solids loads in the effluent could also be reduced by approximately 200,000 pounds per year (assuming an initial average of 1,000 mg/l of COD and TS, respectively, in the untreated chiller water). If the surcharge on excess COD is 20 cents per pound, the surcharge savings could be upwards of $40,000 per year. Thus the potential savings for water, sewer, and surcharges could total $85,000 per year. Other savings might be realized through by-product recovery and reductions in energy costs.

Accordingly, significant savings can be attained by both recycling some or all of the various wastewater streams and reducing the amount of fresh water usage. Additional savings are also derived through reduction in sewage volume, waste disposal surcharges and total refrigeration load.

The food processing industry in general, and the poultry industry in particular, seeks cost-effective reduction and recycling technologies for food processing wastewaters. These technologies include both source reduction options (technologies to reduce the amount of water used) and treatment options (technologies to reduce the amount or contamination level of wastewaters requiring discharge). Historically, food processors located within or adjacent to municipalities have relied on local publicly owned treatment works (POTW) for wastewater treatment and disposal. Increasingly, this option is becoming less available. Municipal and regional sewer authorities are applying more pressure on industries to reduce their organic (BOD and COD) suspended and dissolved solids loading to the sewers, as in the last five to ten years, there has been an increase in enforcement pressure to comply with wastewater discharge permits and a decrease in federal grants for constructing new and upgrading existing treatment works.

A number of methods are used to reduce wastewater discharge amounts and/or contaminant levels. These methods can be classified into two major classes: source reduction that includes technologies and operations that reduce the amount of wastewater generated in the first place; and treatment options that include technologies and operations that treat wastewater to reduce levels of contamination, either to facilitate in-plant recyclability or to reduce costs of treatment (which are often indexed to contaminant concentrations). Both of these strategies are important to food processing and to wastewater reduction strategies.

The primary requirements of a successful recycling and reuse program are that the treatments be economical, effective, reliable, easily monitored, and avoid the use of chemical additives. Yet no prior reuse program has been able to meet all of these requirements successfully. As one example, dissolved air flotation (DAF) systems combined with disposable filter cartridges have been used to remove the fats, oil and grease combined with the micro-organisms. However, the short life of the disposable type filters (even with attempted air blow-back) and the resultant labor intensiveness of the DAF system preempted success. Ozonation for producing reusable water also has been used in conjunction with DAF systems, but the excessive organic loading required ozone usage well above economical limits. Further, precoat filter systems using such materials as, for example, diatomaceous earth and celite, also proved too labor intensive, too costly, not very reliable, and not readily adaptable for automatic operation. Chemical additives and flocculants to improve filtration also are costly and require complete removal from the final reconditioned water prior to reuse so as not to be considered as a "Food Additive". This drawback of complete removal also applies to residual ozone and filter systems.

Sterilization of wastewater through ozonation alone is being tested as a method to provide sterilization and reduce bacterial counts, permitting closed-loop recycling of rinse and chiller waters. Ozonation works in a manner similar to chlorine disinfection (in both technologies, a reactive gas is introduced to the wastewater stream to chemically disinfect the stream), but avoids the concern of introducing chlorinated organic compounds to the wastewater stream. One disadvantage of ozonation itself is that it leaves ozone in the water stream that will eventually deposit on the food product as a residue.

Further, present testing methods used in connection with the above reuse systems can take from 2 to 3 days to get results on chill water pathogen levels, all the while during this time, contaminated chill water reuse can be ongoing.

Thus it can be seen that there is a need for an effluent purifying system to enable chiller water reuse in the poultry processing industry, which system does not use chemicals or ozone to purify the water. It is to the provision of such purifying systems that the present invention is primarily directed.

SUMMARY OF THE INVENTION

Presently, poultry plants in this country are looking for a system that can provide purification and recycling of water used to process poultry. The poultry industry is investigating systems that will enable processors to use the necessary amounts of water to sufficiently clean and process poultry products. Before Jan. 15, 1998, the average poultry plant used approximately 1,300,000 gallons of water per day.

After Jan. 15, 1998, the USDA implemented the "zero tolerance rule" to prevent fecal matter from entering the chillers used in poultry processing. The rule dictates that no fecal matter is allowed on the birds as they enter the chillers. This rule necessarily caused an increase in the use of water in the poultry industry to try to entirely wash the fecal matter from the bird carcass before chilling.

When the USDA implemented the "zero tolerance rule," the average plant water usage jumped to over 2,000,000 gallons of water per day, and in some plants, over 2,500,000 gallons of water per day. This drastic increase in water usage added to the problems the industry was already facing every production day, including the high cost to purchase water, and the shortage of water as a result of the increased demands in other industries. To off-set these problems, many plants turned to wells as a helpful solution to their problems, only to find that in many cases the well water was contaminated by surface water runoff. These plants had no other solutions than to cut back production and in some cases close.

There have been several unsuccessful attempts to recycle process water. In these attempts, companies were perhaps able to filter the water, but they all had at least one major problem. They were forced to rely on chemicals added to the water to meet the USDA guidelines. In such cases, the companies were unable to reduce the pathogens in the water without leaving the residue of the chemical on the product. USDA inspectors and plant employees have had to evacuate a plant testing such attempts in an effort to avoid being overcome with the chemicals that were added to control pathogen levels in their systems.

It would be beneficial to provide a purification system that can filter water to 10 microns, and in some cases as low as 5 microns. In addition, it would be advantageous to reduce the pathogens in the water by up to 99.99%, which would exceed the present USDA requirements of reduction in pathogen levels.

Another problem that faces the industry is the extended delay in receiving pathogen level information back from the testing laboratories. It would be beneficial to provide a system that would allow the industry to have this testing data within seconds, that would otherwise have taken a number of days, and in some cases up to a week to receive with prior reuse systems. Preferably, this system should be able to test the pathogen level at the front of the system, then measures and compares the pathogen levels at the end of the system. This information could then be fed to a PLC and stored where it can be retrieved as needed to verify the affect of the present system. It is provision of such a system that the present invention is directed.

Another advantage over the prior art is a system that incorporates progressive treatment for reconditioning and eventual reuse of water used in the poultry and food industries, especially water used in the chiller. Briefly described, in its preferred form, the present purification system incorporates a plumbing network, an automatic filtration assembly, an ultraviolet disinfection assembly and a water test assembly. The used process water is first filtered to reduce or eliminate the amount of particulate matter in the water. The water can be filtered by one or more stages of filters. The water is then passed through a source of ultraviolet energy to reduce or eliminate the pathogens in the water. The water continuously is monitored for the system's purification effectiveness. It is particularly adaptable for automatic and continuous operation without addition of and subsequent possible reentry of treatment products and chemicals.

The present invention provides a continuous effluent purifying system that utilizes ultraviolet (UV) energy as one step in the sterilization process. The UV energy destroys nearly all forms of harmful microorganisms and pathogens in the water. Because the wastewater in the process line is sterilized, it can be reused and when necessary and disposed of easily.

Although the present process and apparatus advantageously can be utilized in reconditioning various wastewaters, and particularly those in the poultry and food processing industries, it has been found that the present process is especially useful for reconditioning overflow chill water for direct reuse in conventional submerged poultry liquid chill tanks. Further, the present system can be used to recondition the inside/outside bird wash water, as well as the final bird rinse water. Other food processing industries in which the present invention has application include the pork, beef and diary food processing industries.

Accordingly, it is an object of the invention to provide a system for inexpensively reconditioning wastewater in the poultry and food processing industries.

It is a further object of the present invention to purify chill water from poultry chill water tanks and other poultry processing wastes water for direct reuse in lieu of a continuous, once through fresh water system.

It is another object of the present invention to provide a purification system that passes the waste water through a series of assemblies, including an automatic filtration assembly, an ultraviolet disinfection assembly and a water testing system, wherein treatment chemicals and filtration aiding additives are not used, and wherein the reused waste water conforms to current USDA regulations for acceptable water quality for reuse.

It is yet another object of the invention to provide a wastewater recycling system that exposes the wastewater to UV energy.

These and other objects, features and advantages of the present invention will become more apparent upon reading the following specification in conjunction with the accompanying drawing figures.

DETAILED DESCRIPTION OF PREFERRED EMBODIMENTS

Figure 1:
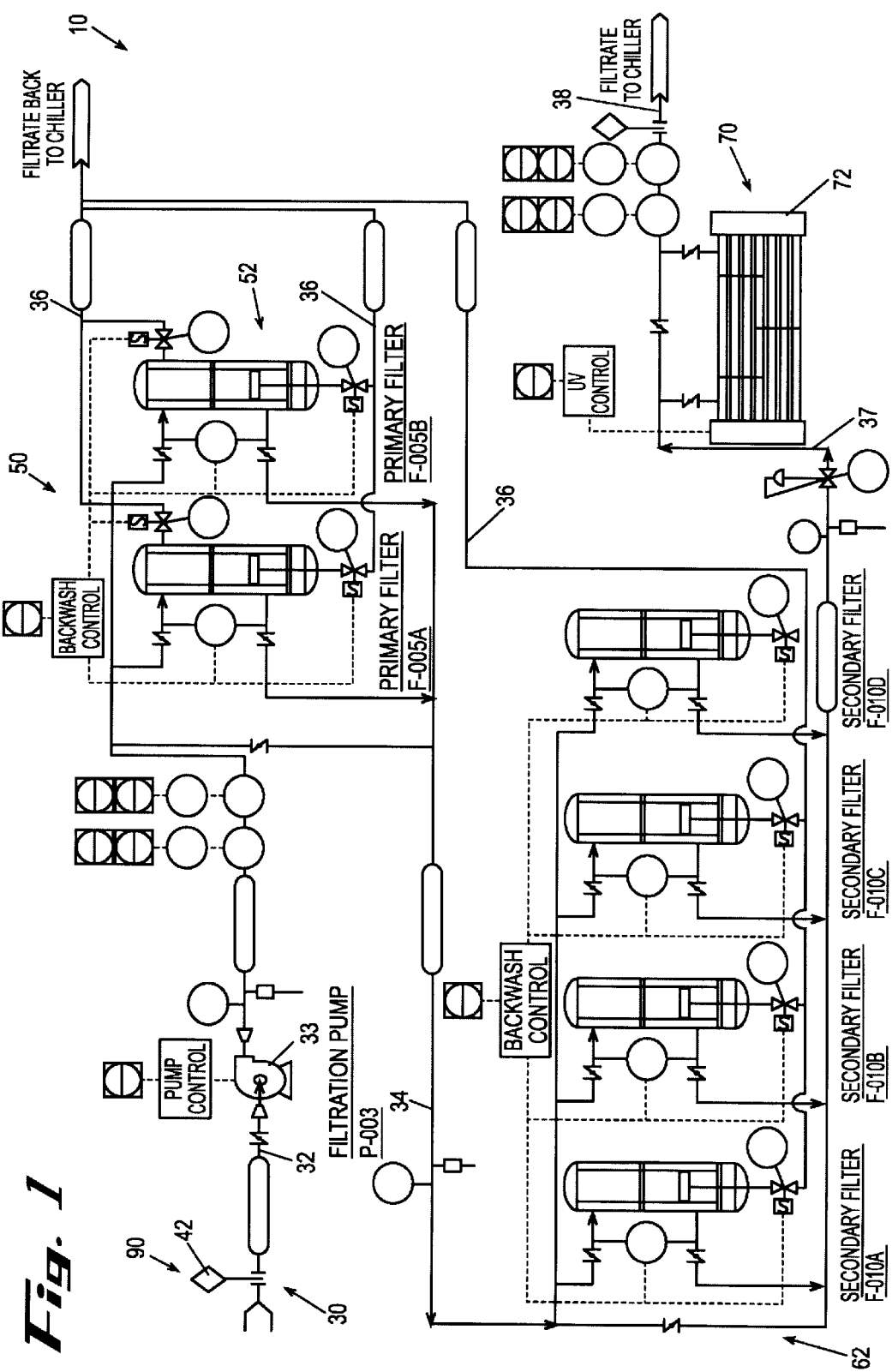
FIG. 1 shows a system diagram of the present invention according to a preferred embodiment.

Briefly described, in a preferred form, the present invention provides an effluent purifying system 10 comprising a plumbing network 30 to transfer the chill water overflow from the chiller 20 through the present purifying system 10 and back to the chiller 20, an automatic filtration assembly 50, an ultraviolet disinfection assembly 70 and a water test assembly 90.

Figure 2:
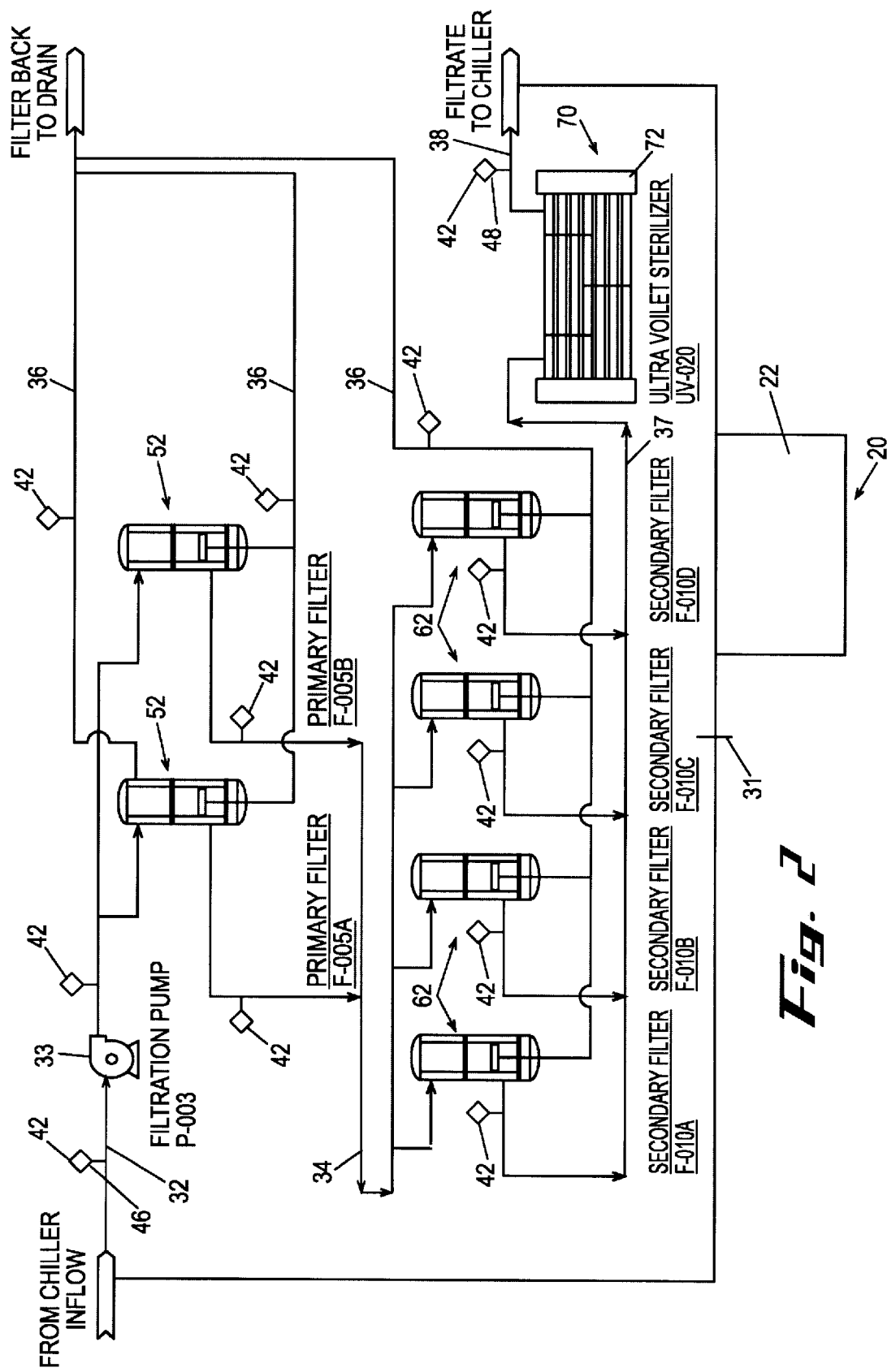
FIG. 2 shows another system diagram of the present invention according to FIG. 1, and includes the chiller.
Figure 3:
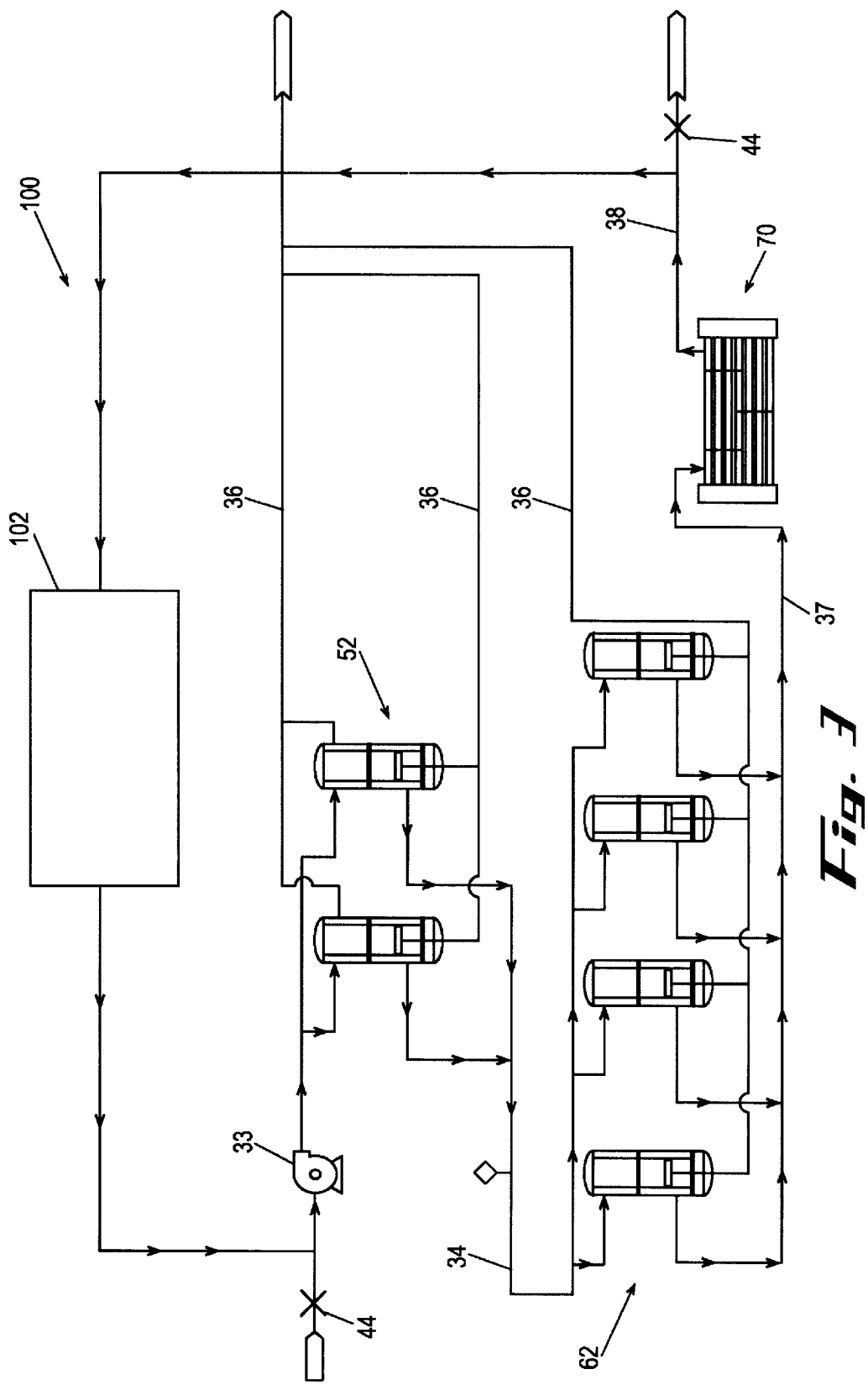
FIG. 3 shows another system diagram of the present invention according to FIG. 1, and includes the clean-in-place system.

Referring to FIGS. 1–3, the present system is generally depicted by reference numeral 10. The chiller 20 includes a wash tank 22 for holding water, ice, and carcasses. The tank should be of a volume that is sufficient to hold enough water to treat all of the carcasses. In the case of poultry, the USDA provides that one-half gallon of water needs to be added for each bird placed in the chiller. The wash tank 22 is preferably constructed of an inner shell of stainless steel that has been coated on the outside with insulation, followed by an outer shell of stainless steel.

The plumbing network 30 generally comprises the tubing, valves, meters, pumps and the like to transfer the chill water overflow throughout the several assemblies of the present invention 10. The various elements of the plumbing network will be described in detail below as reference is made to each assembly 50, 70, and 90.

Preferably, the present invention 10 comprises an automatic filtration assembly 50 incorporating two different stages of filters 52, 62, although it will be understood that one or more filter stages can be used. Herein, references to the different stages and/or filters will be used interchangeably. The overflow chill water first is removed from the chiller 20 via water line 32, then preferably pumped through a USDA food grade filtration pump 33 of the plumbing network 30. A screen 31 that permits the free flow of water therethrough, is preferably positioned to block the exit end of tank 22 into piping 32 to prevent carcasses from entering piping 32. The filtration pump 33 successfully has been tested as a 30 hp pump. The chill water then continues through water line 32 to the first stage of filters 52. It will be understood that other pumps may be distributed along the plumbing network 30 to facilitate the flow of chill water therethrough. plumbing network 30. A screen 31 that permits the free flow of water therethrough, is preferably positioned to block the exit end of tank 22 into piping 32 to prevent carcasses from entering piping 32. The filtration pump 34 successfully has been tested as a 30 hp pump. The chill water then continues through water line 32 to the first stage of filters 52. It will be understood that other pumps may be distributed along the plumbing network 30 to facilitate the flow of chill water therethrough.

The first stage of filters 52 serves as a pre-filter to filter out large particles from the chill water. Preferably, these filters can filter up to 500 gallons of water per minute. The filter media of these filters 52 can be changed to handle different sizes of particles. Preferred the EBS BS filter series made by Amiad. Tested filters 52 were the EBS-Brush Filters, while the filters 62 were the EBS-Suction Filters.

The filters 52 operate by capturing undesirable particles from the chill water on the inside surface of the media/screen of the filters. Inlet and outlet water lines 32, 34, respectively, of the plumbing network 30 transfer the chill water through the filters 52. Automatic filters, like the Amiad filters, are self cleaning and operate on line pressure alone, eliminating the need for an external power source. As water passes through the filter, the dirt particles are collected on the screen. This causes a drop in water pressure. When the pressure drop reaches a preset level, a cleaning cycle is initiated. In the cleaning cycle, a vacuum screen cleaner aggressively suctions the dirt form the inside of the screen and flushes it out a waste drain line 36. As shown in FIG. 1, several waste lines 36 transport waste water to a central drain. The backwash cycle is accomplished in seconds without interrupting the main flow. Preferably, when the outlet water pressure drops or varies approximately 7 psi from the inlet water pressure, the filters 52 automatically go into a clean cycle. This entire clean cycle process may only last 2 to 5 seconds depending upon the amounts of waste material on the screens.

From the pre-filters 52, the chill water then travels through water line 34 to the second stage 62 of filters. The plumbing network 30 may incorporate another pump between the two stages 52, 62 of filters. Both the first stage 52 pre-filters and the second stage 62 filters operate in substantially the same fashion, both using deferential pressure to activate the clean cycle of each. One difference between the two stages 52, 62 of filters is the size difference of the media used to trap waste material from the chill water. Preferably, the media size becomes finer as between the first and second stages 52, 62 of filters in order to progressively filter out particulate matter of the chill water as it passes throughout the present purifying system 10. The pre-filter 52 media size used can be, for example, 50 microns, while the second stage 62 filter media can be, for example, 5 to 10 microns. Waste from the filters 62 is expelled out from the filters 62 to the waste line 36.

This present system 10 is further designed to eliminate the need for chemicals and/or ozone to be added to the chiller bath in an effort to reduce pathogens in the chill water. Of the different divisions of the food processing system, pathogen reduction is of greatest concern to both industry and the USDA. The present system 10 preferably eliminates up to 99.99% of the pathogens in the chill water by passing the chill water through an ultraviolet disinfection assembly 70. Ultraviolet disinfection can be used especially in low-concentration wastewater streams (or high-concentration streams with high clarity) to permit reuse of the water. It is of particular interest in applications such as chiller water recycling, where pathogenic contamination is the primary obstacle to recycling of the water stream. UV disinfection provides the industry tremendous flexibility with the potential of adding additional days' shelf life to their product. The present purifying process 10 will reduce, or in some cases eliminate, the need for chlorine to be added to the system to kill pathogens.

UV generator 72 is provided as a source of UV energy. The UV generator 72 should be one that has been approved by the USDA. A preferred UV source is the Aquionics Inline 1250 UV machine from Aquionics, Inc. of Erlanger, Ky. The generator 72 is preferably of a capacity that is sufficient to eliminate over 99% of the pathogens in the chill water entering the UV sterilizer 72 from water line 37. After passing through the UV generator, the sterilized water is returned to wash tank 22 via piping 38. Preferably, the UV generator 72 provides a transmission of approximately 44% in a 1 cm cell at 253.7 nm.

In order to assure the effectiveness of the entire system 10, the present system further comprises an in-line waster test system 90, including measurement devices to measure pathogens, temperature, water flow and other characteristics of the water stream. This method to measure pathogens in-line at the industry process level is believed novel. The water test assembly 90 comprises a plurality of sample port 42. As shown in FIGS. 1–3, a preferred embodiment of the present system 10 comprises two pre-filters 52 and four final filters 62. FIG. 2 illustrates the system 10 incorporating 12 sample ports 42. One before and one after pump 33, one after each pre-filter 52, one in each waste line 36 from the pre-filters, one after each final filter 62, one in the waste line 36 of the final filters and one after the UV machine 72. It will be understood that the number of filters and sample ports can vary among alternative embodiments of the present invention.

Probes in the sample ports 42 feed monitored information to a PLC to be compared with information from other probes in different sample ports 42. The data is stored in the PCL and retrievable as needed to aid with the hazard analysis critical control point (HACCP) and Quality Control Programs. In a preferred embodiment, the sample port 46 in front of the system 10 just inside the inlet water line 32 coming from the overflow water source has both a microbe and a temperature probe. At the end of the system 10, inside the outlet water line 38, just before the reuse of the chill water, sample port 48 has both microbe and a temperature probe. The inlet port 46 feeds information from the inlet source to a PLC to be compared with the information fed from the outlet source at port 48. The preferred system to track and compare the microbes at the front of the system to the end of the system is the Biotrace Auto-Track CFL system, an on-line system. The data from this tracking system can be stored in the PLC for later recall as needed.

At each sample port, the. water stream can be tested by known devices for, among others, temperature, clarity, BOD, COP, TS, turbidity, $NH_3$, $PO_4$, APC, *E. coli* and salmonella, to determine the level of purification and effectiveness of the system 10. Turbidity and light transmission units are directly correlated to indicate clarity and acceptable micro-organism removal.

Jay Industrial Technologies Group (JITG) temperature probes and flow meters, and Baldor pumps and pump motors were used in test models of the present invention, and are mentioned as examples. The temperature probe can include the JITG+GF+Signet 8300 temperature transmitter, and the flow meters can include the JITG FT10-1405 Termo-Flo Switch, LC30-100-1 high or low relay controller. Sample ports can be located between filters in the automatic filtration assembly 50. The water test assembly 90 provides information about microbe levels and other characteristics within a matter of seconds that prior art systems can presently only deliver in 3 days or more. Assembly 90 further protects the industry from the possibility of selling contaminated product by assuring that the filtration assembly 50 and the ultraviolet assembly 70 are effective.

The present system 10 can further comprise a clean-in-place (CIP) system 100 that closes the loop of the system 10 and enables water to be circulated through the system for easy clean up of the entire system and most all of the components. As shown in FIG. 3, once all the product has been processed, a tank 102 is filled with water, and cleaning chemicals added. Then pump 33 surges the water through the system 10. Valves 44 are closed during cleaning so the CIP water does not enter the chiller 20.

The effluent purifying system of the present invention can comprise several alternative embodiments. For example, the system 10 can have a single stage filtration assembly instead of the multi-stage assembly shown herein. Further, the multi-stage assembly can consist of two or more stages. In another embodiment of the present invention, pumps can be placed between the various filters stages of present invention.

While our invention, in a preferred form, has been described in connection with the cleaning and purifying of poultry chiller waste water, this same system can be used to clean and purify waste water from the inside/outside bird washer water and the final bird wash rinse water units in a poultry process. Similarly, the invention can be used to clean and purify waste water from pork, beef and dairy processing plants and other food processing plants.

Although the present invention has been described with reference to preferred embodiments, it will be apparent to those skilled in the art the variations and modifications of the present invention are within the spirit and scope of the present invention.

What is claimed is:

1. An effluent purifying system capable of purifying effluent, said system comprising:
   (a) a filtration assembly capable of filtering a portion of any particulate matter in the effluent from the effluent;
   (b) an ultraviolet disinfection assembly capable of destroying a portion of any pathogens in the effluent;
   (c) an effluent test assembly capable of periodically testing the effluent for particulate matter and pathogen levels in the effluent; and
   (d) a plumbing network trough which the effluent can travel throughout the purifying system.

2. The purifying system of claim 1, said filtration assembly comprising a self cleaning filter.

3. The effluent purifying system of claim 1, said filtration assembly comprising at least one pre-filter and at least one final filter, said at least one pre-filter having a pre-filter media capable of filtering out larger particulate matter from the effluent than said at least one final filter having a final filter media capable of filtering out smaller particulate matter from the effluent, said filters being self cleaning filters.

4. The purifying system of claim 3, said pre-filter media size being about 50 microns, and said final filter media being about 10 microns.

5. The purifying system of claim 1, said ultraviolet disinfection assembly comprising a UV generator.

6. The purifying system of claim 5, said UV generator capable of providing a transmission of approximately 44% in a 1 cm cell at 253.7 nm.

7. The purifying system of claim 1, said effluent test assembly comprising in-line measurement devices capable of measuring pathogen level, temperature and effluent flow rate.

8. An effluent purifying system capable of purifying effluent, said system comprising:
   (a) a filtration assembly capable of filtering a portion of particulate matter in the effluent from the effluent; and
   (b) an ultraviolet disinfection assembly capable of destroying a portion of pathogens in the effluent; and
   (c) a clean-in-place subsystem capable of enabling cleaner solution to be circulated through said effluent purifying system for clean up of said purifying system.

9. A water purifying system capable of purifying water having particulate matter and pathogens, said system comprising:
   (a) a plumbing network through which the water can travel throughout the purifying system;
   (b) a filtration assembly capable of filtering a portion of the particulate matter in the water from the water, said filtration assembly incorporating at least one pre-filter and at least one final filter, said at least one pre-filter having a pre-filter media capable of filtering out larger particulate matter from the water than said at least one final filter having a final filter media capable of filtering out smaller particulate matter from the water, said filters being self cleaning filters; and (c) an ultraviolet disinfection assembly capable of destroying a portion of the pathogens in the water, said ultraviolet disinfection assembly having a UV generator.

10. A water purifying system capable of purifying water having particulate matter and pathogens, said system capable of purifying water from a chiller in a food processing plant, said system comprising:
(a) a plumbing network through which the water can travel throughout said purifying system, said plumbing network capable of circulating effluent water from the chiller, through the present system, and back to the chiller;
(b) a filtration assembly capable of filtering a portion of the particulate matter in the effluent water from the chiller, said filtration assembly incorporating at least one pre-filter and at least one final filter, said at least one pre-filter having a pre-filter media capable of filtering out larger particulate matter from the effluent water than said at least one final filter having a final filter media capable of filtering out smaller particulate matter from the effluent water, said filters being self cleaning filters;
(c) an ultraviolet disinfection assembly capable of destroying a portion of the pathogens in the effluent water, said ultraviolet disinfection assembly having a UV generator; and
(d) a clean-in-place subsystem capable of enabling cleaner solution to be circulated through said plumbing network for clean up of said purifying system.

11. The purifying system of claim 10 further comprising a water test assembly capable of periodically testing the water for particulate matter and pathogen levels in the water.

12. The purifying system of claim 11, said water test assembly comprising in-line measurement devices capable of measuring pathogen level, temperature and water flow rate.

13. The purifying system of claim 11, said water test assembly further comprising at least one sample port through which the measurement devices come in contact with the effluent stream in the plumbing network.

14. The purifying system of claim 10, said pre-filter media size being about 50 microns, and said final filter media being about 10 microns.

15. The purifying system of claim 10, said UV generator capable of providing a transmission of approximately 44% in a 1 cm cell at 253.7 nm.

16. A method of purifying effluent, said method comprising the following steps:
(a) filtering the effluent, said filtering step being capable of filtering a portion of any particulate matter in the effluent from the effluent, the effluent travelling through a plumbing network;
(b) disinfecting the effluent, said disinfecting step being capable of destroying a portion of any pathogens in the effluent using UV energy; and
(c) cleaning said plumbing network, said cleaning step being provided by a clean-in-place subsystem capable of enabling cleaner solution to be circulated through said plumbing network.

17. The purifying method of claim 16, said filtering step utilizing a filter having a media, the media size being less than about 50 microns.

18. The purifying method of claim 16, said disinfecting step utilizing a UV generator capable of providing a transmission of approximately 44% in a 1 cm cell at 253.7 nm.

19. The method of purifying effluent according to claim 16, said method further comprising the step of testing the effluent periodically for pathogen levels in the effluent.

20. The method of purifying effluent according to claim 16, said step (a) of filtering the effluent comprising the following substeps:
(i) pre-filtering at least a portion of particulate matter in the effluent from the effluent through a pre-filter, and
(ii) final filtering at least a portion of particulate matter in the effluent from the effluent through a final filter.

* * * * *